UNITED STATES PATENT OFFICE.

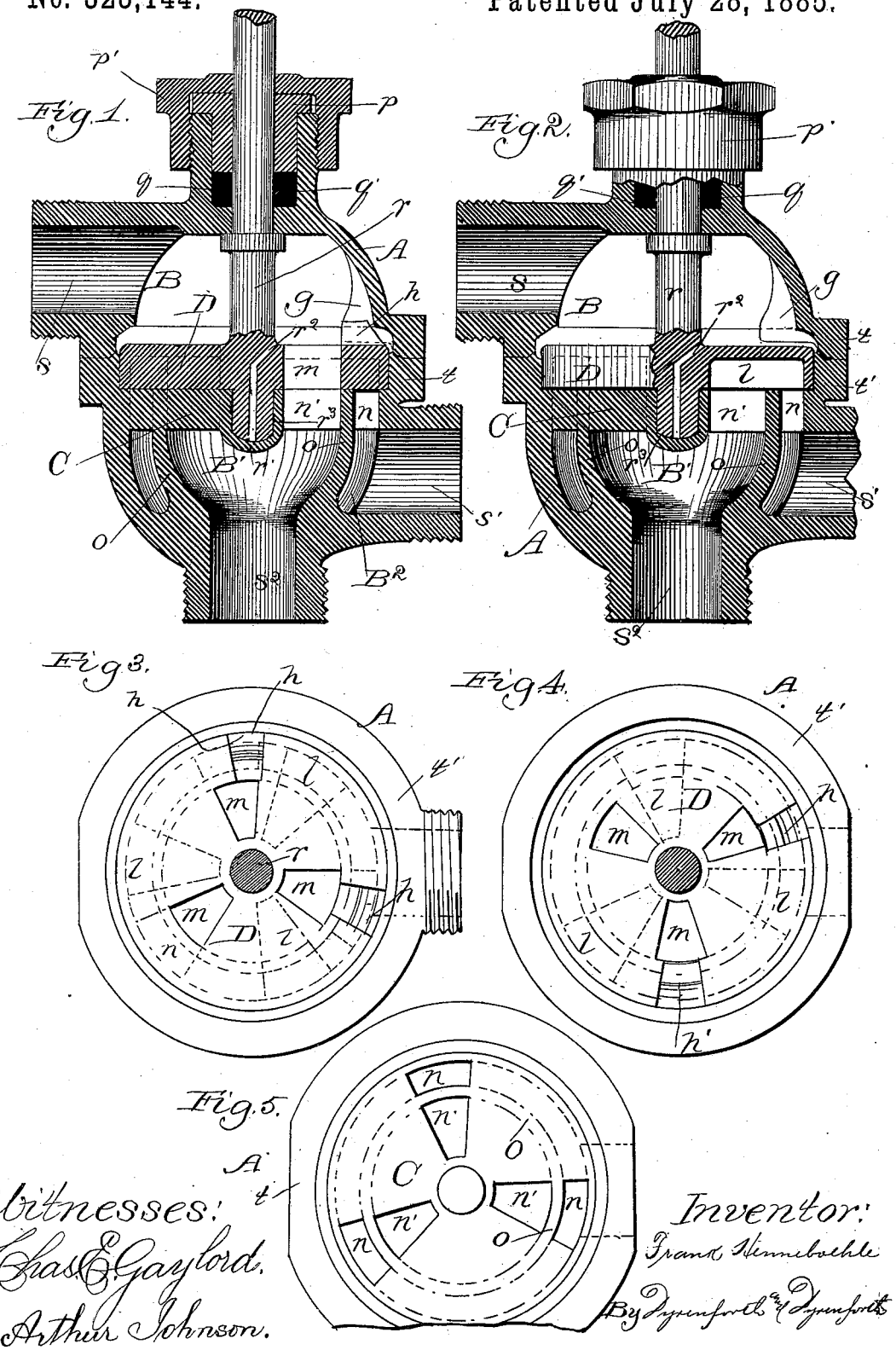

FRANK HENNEBOEHLE, OF SOUTH CHICAGO, ILLINOIS.

VALVE.

SPECIFICATION forming part of Letters Patent No. 323,144, dated July 28, 1885.

Application filed July 8, 1884. (No model.)

*To all whom it may concern:*

Be it known that I, FRANK HENNEBOEHLE, a subject of the Emperor of Germany, residing at South Chicago, in the county of Cook and State of Illinois, have invented certain new and useful Improvements in Valves; and I hereby declare the following to be a full, clear, and exact description of the same.

My invention, as shown in the present connection, is particularly adapted for use as an hydraulic valve—such as would be employed to control the operation, for instance, of a hydraulic elevator or crane. Water is not, however, the only power with which my invention is capable of use. It will work just as satisfactorily as a steam or air pressure valve. My device is represented in the drawings as disconnected from the source of power, and from the object which such power may be desired to operate, though screw-threads are shown where the connections may be made.

For convenience in explaining the working of my device, the description of its operation is prepared with reference to its supposed connection with a cylinder containing a piston head and rod reciprocated by hydraulic pressure.

Figure 1 is a central vertical section of my invention showing the valve in a position to permit the passage of water through the device; Fig. 2, a similar view showing the valve in a position to permit the discharge of water through the device; Fig. 3, an upper plan view of the device having the part containing the water-inlet and forming the upper portion of the valve-chamber removed to show, partially in dotted lines, the construction of the valve, and showing it open to admit water through it; Fig. 4, a view similar to that shown in Fig. 3, but representing the valve as turned to permit the discharge of water, and Fig. 5 an upper plan view of the device having the entire upper portion, including the valve, removed, and showing the construction of the valve-seat.

A is the shell formed in two parts, $t$ and $t'$, the upper part, $t'$, containing the valve-chamber B, and being provided with the water-inlet $s$ at one side, leading into the chamber B, and with an opening in its upper side to admit the stem $r$. A cylindrical chamber, $q$, surrounding a portion of the stem is shown as formed to project outward from the shell A around the opening therein to admit the stem, which chamber $q$ contains suitable packing, $q'$. The packing is retained in position by means of a plug or bush, $p$, fitting within the chamber $q$, and provided with a central opening to receive the stem $r$, and a perforated cap, $p'$, is provided to screw upon the cylinder forming the chamber $q$ to hold the plug or bush $p$ in place. The lower portion of the shell A contains the chambers B' and B², which are separated from each other by the intervening wall $o$, and the water-discharge $s'$ and conduit $s^2$, at which latter connection of the device may be made with a cylinder containing a piston and rod, as hereinbefore mentioned.

C is the valve-seat cast with the lower portion of the shell A. Three openings, $n$, preferably of the segmental form shown, are provided through the valve-seat and lie directly over the chamber B², the diameter of the openings being equal to that of the chamber openings $n'$; also preferably of the segmental shape shown, are formed through the valve-seat, extending toward its center and leading into the chamber B'. Each opening $n$ is separated from an opening, $n'$, by the wall or bridge $o$.

D is the valve, in the form of a perforated disk, which rests upon the disk-shaped valve-seat C, and is turned thereon by means of the stem $r$ cast with the valve. A pin, $r'$, is provided on the lower side of the valve forming an extension of the stem $r$, which fits into the valve-seat to turn centrally in the latter. A channel, $r^2$, is formed in the stem $r$ leading from the point of junction of the stem with the valve D, through the pin $v'$, and into a chamber, $r^3$, formed in the valve-seat C to receive the pin $r'$. Three openings, $m$, similar in shape and size to the openings $n'$ in the valve-seat and arranged to coincide with the latter, when desired, are formed through the valve D. Three recesses, $l$, each of a shape corresponding with that of the openings $n'$ and $n$ in the valve-seat, and equal in dimensions to the openings $n'$ and $n$ and the intervening wall $o$ combined, are formed in the under side of the valve D, as indicated by the dotted lines in Figs. 3 and 4 of the drawings.

The operation of my device is as follows:

Imagining it to be connected at the conduit $s^2$ with a cylinder containing a piston head and rod operating against the resistance of a weight to raise the latter, when it shall be desired to admit water into the cylinder, the valve D is turned to bring the openings $m$ in it coincident with the openings $n'$ through the valve-seat. Water then entering the chamber B through the inlet $s$ will pass through the valve and valve-seat into the chamber B', and thence through the conduit $s^2$ into the cylinder. By turning the valve to the left the openings $m$ and the recesses $l$ will be covered on their under sides by the upper surface of the valve-seat C, and the openings $n'$ in the valve-seat will be covered by the lower surface of the valve D; hence the device will be shut and no water can pass through it into the cylinder nor escape upward from the cylinder, as all the openings $n$ and $n'$ in the valve-seat will be closed by the valve, and the weight will be held in position at any desired point by the pressure of the water in the cylinder against the piston-head. When it is desired to raise the weight still further the valve is turned back to the right to bring the openings $m$ in it coincident with the openings $n'$ in the valve-seat, again permitting the flow of water through the device; and this operation may be repeated as often as required.

To lower the weight, the water contained in the cylinder must be discharged. To effect this, the valve G is turned still further to the left from the position in which it is closed to bring the recesses $l$ coincident with the openings $n$ and $n'$ in the valve-seat, when the pressure of the weight will cause the piston-head to force the water contained in the cylinder through the conduit $s^2$ into the chamber B' of the device, and through the openings $n'$ in the valve-seat into the recesses $l$ in the valve and over the wall $o$ into the chamber B², whence it will discharge through the outlet $s'$. As in the case of raising the weight, the latter may be brought to rest at any position by closing the valve to prevent further discharge of the water, by simply turning the valve sufficiently far to the right.

The portion of a circle in which the valve is arranged to move in performing all of the three operations above described, of admitting water, discharging it, and preventing such admission and discharge, is about seventy-five degrees. At one extremity of this space a stop, $h$, and at the opposite extremity a stop, $h'$, are formed at the desired points upon the upper side of the valve D, and a stop, $g$, is formed within the chamber B of the shell, directly over the center of the outlet $s'$. These parts are so arranged that when water is to be admitted through the device the stop $h$ abuts upon its inner side against one side of the stop $g$, and when the water is to be discharged from the cylinder the valve is turned to the left until the stop $h'$ abuts upon its inner side against the stop $g$. The device is closed when the stop $g$ is in the center between the stops $h$ and $h'$. Ordinarily the valve will be operated by a lever connected with the stem $r$.

The construction of valve shown in the drawings, and herein described, is capable of use, as before stated, as a steam or an air valve, though, in connection with engines in which the fluid acts upon each side of a piston-head to reciprocate it, the openings $n$ in the valve-seat, and the wall $o$ in the shell forming the chamber B², and the recesses $l$ in the valve D, may be omitted, since other well-known means may be provided for exhausting the fluid from the cylinder. Where this form of valve is employed two such devices may be used, and so connected together that when the openings $m$ in one valve, D, are made to coincide with the openings $n'$ in its seat, or opened to admit the fluid to one side of the piston-head, the openings $m$ in the other valve shall be brought out of coincidence with the openings $n'$ in its seat, or closed, and the fluid contained in the chamber formed in the cylinder by the position of the piston-head, attained through the medium of the last-named valve before closing, be allowed to exhaust.

The purpose of the channel $r^2$ is to permit water to enter underneath the valve, whereby a counter pressure shall be exerted against the latter when water is admitted to pass through the device, and the effect of the weight of the water upon the valve D overcome, whereby the latter is caused to work easily.

What I claim as new, and desire to secure by Letters Patent, is—

1. A valve comprising, in combination, the following elements—viz., a shell, A, having an inlet, $s$, and an outlet, $s^2$, a valve-seat, C, within the said shell, having openings $n'$ through it, a chamber, $r^3$, formed on the lower side of the said valve-seat, and communicating with the upper portion of the interior of the said shell, a valve, D, resting upon the valve-seat, and having openings $m$ through it corresponding with the openings $n'$ in the valve-seat, and means for rotating the valve D upon the valve-seat C, all substantially as described, and for the purpose set forth.

2. A valve comprising, in combination, the following elements—viz., a shell, A, comprising the parts $t$ and $t'$, and provided with an inlet-opening, $s$, and an outlet-opening, $s^2$, a valve-seat, C, cast within the shell A, and provided with openings $n$ and $n'$, and with a chamber, $r^3$, communicating with the interior of the part $t$ of the said shell, a wall, $o$, within the shell A, separating the openings $n$ and $n'$ from each other, a chamber, B², formed by the said wall, a discharge-opening, $s'$, leading from the chamber B², a disk-shaped valve, D, resting upon the valve-seat C, and provided with openings $m$ to correspond with the openings $n'$ in the valve-seat, and with recesses $l$ to correspond with the openings $n$ and $n'$ in the valve-seat, and wall $o$ between them, and means for rotating the valve D upon the valve-seat C, the whole being constructed and arranged to operate, substantially as described.

3. A valve comprising, in combination, the following elements—viz., a shell, A, formed in two parts, $t$ and $t'$, and provided with an inlet-opening, $s$, in the part $t$, and an opening, $s^2$, in the part $t'$, a valve-seat, C, cast with the part $t'$ of the shell A, and provided with openings $n$ and $n'$ leading into the chamber B' in the part $t'$ of the shell, and with a chamber, $r^3$, communicating with the interior of the part $t$ of the said shell, a wall, $o$, cast within the part $t'$ of the shell A, and extending between the openings $n$ and $n'$ in the valve-seat, a chamber, $B^2$, formed below the valve-seat by the wall $o$, a discharge-opening, $s'$, leading from the chamber $B^2$, a disk-shaped valve, D, resting upon the valve-seat C, and provided with openings $m$ to correspond with the openings $n'$ in the valve-seat, and with recesses $l$ to correspond with the openings $n$ and $n'$ in the valve-seat, and wall $o$ between them, stops $h$ and $h'$ upon the valve D, stop $g$ formed upon the part $t$ of the shell A, and lying between the stops $h$ and $h'$, and means for rotating the valve D upon the valve-seat C, the whole being constructed and arranged to operate, substantially as described.

FRANK HENNEBOEHLE.

In presence of—
LOUIS A. FREY,
DOUGLAS DYRENFORTH.